United States Patent Office 3,305,574
Patented Feb. 21, 1967

3,305,574
ISOCYANATE PROCESS
Wilfried Zecher and Hans Holtschmidt, Cologne-Stammheim, Germany, assignors to Farbenfabriken Bayer Aktiengesellschaft, Leverkusen, Germany, a German corporation
No Drawing. Filed Nov. 6, 1963, Ser. No. 321,668
Claims priority, application Germany, Nov. 24, 1962, F 38,387
5 Claims. (Cl. 260—453)

This invention relates to aromatic isocyanates and more specifically to a method for the preparation of ring chlorinated isocyanates.

It is known that aromatic isocyanates halogenated in the nucleus may be prepared by chlorinating or brominating the corresponding aryl isocyanates (Houben-Weyl, 5/3, page 709; A. 562, 92, 1949). When the isocyanates that are to be halogenated contain alkyl groups, it is possible to introduce most of the halogen into the nucleus, but a small percentage of the halogen is invariably introduced into the alkyl groups. These aryl isocyanates which are halogenated in the side chain split off their halogen relatively easy again and can, therefore, have an extremely disturbing effect in many reactions even though they are present in only a small proportion. For example, reaction with alcohols or polyesters which contain —OH groups or polyethers to form polyurethanes is inhibited and the properties of the foam plastics or elastomers obtained are considerably impaired. Furthermore, alkyl-aryl isocyanates which are chlorinated or brominated in the side chain are very rapidly discolored by light. Their removal by the usual methods, for example, by distillation, gives rise to difficulties because the boiling points of the corresponding isocyanates are close together and separation must be carried out with considerable care.

It is, therefore, an object of this invention to provide a novel method for the preparation of isocyanates which is devoid of the above-noted disadvantages. A further object of this invention is to provide a method for the production of chlorinated aromatic isocyanates containing only ring chlorination. A further object of this invention is to provide a method for the production of polyisocyanate compositions containing a minimum amount of aliphatically bonded halogenated atoms. A still further object of this invention is to provide a method for the production of halogenated aromatic isocyanates which are useful in the further production of polyurethane compositions. A still further object of this invention is to provide polyisocyanate compositions that may be used to make polyurethane foams which have a high resistance to discoloration.

The foregoing objects and others which are accomplished in accordance with this invention are provided, generally speaking, by providing a method for the production of isocyanate compositions having the general formula (I)

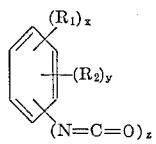

wherein $R_1$ represents chlorine or bromine, $R_2$ represents an alkyl group which may be further substituted with aryl- or isocyanate- or aryl-isocyanate radicals and wherein $x$ may be 1:5, $y$ may be 1:3 and $z$ 0:3 (wherein the sum of $x$, $y$ and $z$ must not be greater than 6 and wherein $z$ can be zero only in case of an isocyanato substitution of at least one $R_2$ radical) may be obtained uncontaminated by (halogenoalkyl)-aryl isocyanates. This process comprises halogenating a composition having the general formula (II)

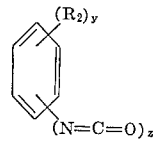

to obtain thereby a halogenated reaction mixture containing above said composition of Formula I and subsequently reacting said reaction mixture with a nucleophilic aromatic composition, and separating from the resulting mixture the composition of Formula I above.

It has now been found that isocyanates of the general formula

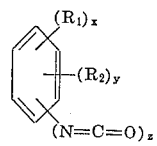

in which $R_1$ represents chlorine or bromine, $R_2$ represents an alkyl group which may be further substituted with aryl- or isocyanate- or aryl-isocyanate radicals and in which $x$ may be 1:5, $y$ 1:3 and $z$ 0:3 (where the sum of $x$, $y$ and $z$ must not be greater than 6 and wherein $z$ can be zero only in case of an isocyanato substitution of at least one $R_2$ radical) may be obtained uncontaminated by (halogenoalkyl)-aryl-isocyanates, if isocyanates of the general formula

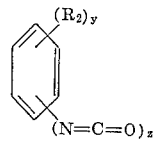

are halogenated in the nucleus in known manner and impurities in the form of (halogenoalkyl)-aryl isocyanates present in the reaction product are converted into a difficultly volatile form by treatment with nucleophilic aromatic compounds in the presence of Friedel-Crafts catalysts and are then separated. For this purpose, the mixture obtained in the halogenating reaction is heated to temperatures between about 60° and 200°, preferably 120 to 160° together with nucleophilic aromatic compounds, e.g. benzene naphthalene, phenol, xylene, anisole, dimethyl aniline, hydroquinone, resorcinol, pyrocatechol, cumol or toluene in the presence of Friedel-Crafts catalysts such as aluminium chloride, tin tetrachloride, ferric chloride, boron trifluoride or zinc chloride. Nucleophilic aromatic compounds and their combined effect with Friedel-Crafts catalysts are described and listed for instance in Ch. C. Price, "The Alkylation of Aromatic Compounds by the Friedel-Crafts Method," printed in Organic Reactions III, pages 1 et seq., especially pages 21 et seq., published by John Wiley and Sons 1947, fourth edition. In order to remove the hydrogen chloride formed and so avoid side reactions, it is advisable to introduce an inert gas such as nitrogen or carbon dioxide at the same time. The reaction is completed when no further hydrogen halide escapes. The quantity of nucleophilic aromatic compound and of Friedel-Crafts catalyst to be added will depend on the quantity of side chain halogen contained in the crude product obtained in the nuclear halogenation process and may vary within wide limits. In general, it will be sufficient to use 1 to 25% of nucleophilic aromatic compounds and 0.1 to 5% of Friedel-Crafts catalyst. The halogenaryl isocyanates may then be separated by a suitable method, e.g. by distillation or by recrystallization, from the [halogen-alkyl]-aryl isocyanates which have been converted into resins. If desired, the purification may be carried out in two stages, which is in fact in many cases very advantageous.

The following are examples of alkyl-aryl isocyanates halogenated in the nucleus which may be prepared pure by this process

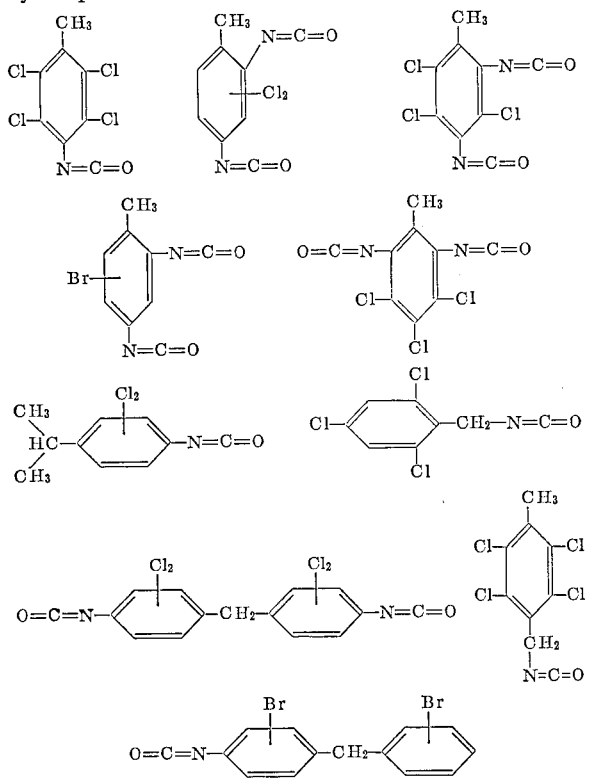

The halogenation in the nucleus of the alkyl substituted aromatic isocyanates is carried out according to known processes by halogenating the corresponding isocyanates, for example, by using suitable catalysts such as iodine and ferric chloride at temperatures between about 20° and 120°. Halogenation may advantageously be carried out in a solvent such as chloroform, carbon tetrachloride or trichloroethylene.

Of the large number of alkyl substituted aromatic isocyanates which may be halogenated in the nucleus and subjected to the process of this invention, the following are given by way of example: p-tolylisocyanate, 2,4-toluylene diisocyanate, 2,6 - toluylene diisocyanate, p - isopropyl phenyl isocyanate, benzyl isocyanate, 4,4'-diphenylmethane diisocyanate, p-methylbenzyl isocyanate, p-diphenylmethane isocyanate, p-isocyanato-benzyl isocyanate, p-xylylene diisocyanate, m-xylylene diisocyanate, 1-methylbenzene-2,4,6-triisocyanate.

The alkyl-[halogenoalkyl]-isocyanates prepared pure by the process described above are valuable starting products for the manufacture of foam plastics, elastomers and lacquers.

The invention will be further described with reference to the following examples which are meant to illustrate and not limit the invention. Parts and percentages are by weight unless otherwise indicated.

*Example 1*

About 1500 grams chlorine are introduced at about 60° C. into a solution of about 1046 grams 2,4-toluylene diisocyanate and about 40 grams iodine in 1 liter of chloroform. The temperature is then raised to about 70° C. and another about 500 grams of chlorine are introduced. The chloroform is distilled off and the residue is degasified for about one hour at about 140° C. in a vacuum produced by a water-jet pump.

About 6 grams ferric chloride and about 50 cc. xylene are then added and nitrogen is then passed through for about one hour at about 130° C. and for another hour at about 160° C. The xylene is then distilled off and the residue is maintained at about 150° C. and 12 mm. Hg for about one hour and then fractionated in vacuo. About 1520 grams corresponding to 91% of the theoretical yield of a pale pink product boiling at about 150 to about 160° C. at 0.8 mm. Hg are obtained. This product still contains about 0.4% of saponifiable chlorine.

The reaction mixture is heated for about three hours at about 160° C. with about 8 grams of ferric chloride and about 50 cc. of xylene while nitrogen is passed through. Xylene is then distilled off and the product is degasified for about one hour at about 150° C. and 12 mm. Hg and fractionated in vacuo. The 3,5,6-trichloro-2,4-toluylene diisocyanate distills off at about 154° C. to about 158° C. at 0.5 to 0.6 mm. Hg and solidifies to a colorless mass (melting point about 101–104° C.) which contains no more saponifiable chlorine. The total yield is about 1412 grams which is 85% of the theoretical yield.

If desired, purification may be carried out in one step by heating for about six hours at about 160° C. after the first addition of xylene and ferric chloride.

$C_9H_3Cl_3N_2O_2$ (277.50). Calculated: C, 38.97; H, 1.09; Cl, 38.34; N, 10.09; saponifiable Cl, 0. Found: C, 38.99, 39.02; H, 1.07, 1.15; Cl, 38.15; N, 10.07, 10.13; saponifiable Cl, 0.

*Example 2*

About 100 grams of the chlorination mixture of Example 1 are stirred for about four hours at about 120° C. with about 5 grams of zinc chloride and about 8 grams of phenol. The mixture is then fractionated in vacuo. The 3,5,6-trichloro-2,4-toluylene diisocyanate distills over at about 130° C. to about 135° C. at 0.2 mm. Hg. It still has a slight odor of phenol. After distilling once more, a pure product is obtained which does not contain any saponifiable chlorine.

Isocyanate number: Calculated: 30.29%. Found: 30.1%, 30.2%.

*Example 3*

About 100 grams of the reaction mixture obtained from nuclear chlorination of 2,4-toluylene diisocyanate are heated for about two hours at about 140° C. with about 8 grams of phenol and 5 grams of anhydrous ferric chloride. The product is then fractionated in vacuo. The distillate still has a slight odor of phenol and is again distilled in vacuo. Pure 3,5,6-trichloro-2,4-toluylene diisocyanate is obtained as a colorless product which does not contain any saponifiable chlorine.

Isocyanate number: Calculated: 30.29%. Found: 30.0%, 30.1%.

*Example 4*

About 1000 grams of chlorine are introduced at about 60° C. into a solution of about 1046 grams 2,4-toluylene diisocyanate and about 40 grams iodine in 1 liter of chloroform. The chloroform is then distilled off and the residue is degasified for about one hour at about 140° C. and 12 mm. Hg and about 15 grams of ferric chloride and about 150 cc. xylene are added. The mixture is heated for about one hour at about 130° C. and six hours at about 160° C. and at the same time nitrogen is passed through. Xylene is then distilled off and the residue is degasified for about one hour at about 150° C. and 12 mm. Hg and fractionated in vacuo. A fraction boiling at about 125° C. to 135° C. and 0.8 mm. Hg is obtained. To remove portions of mono- and di-chlorotoluylene diisocyanate from this distillate, it is again fractionated, using a column with a silver jacket. Dichloro toluylene-2,4-diisocyanate boiling at about 125° C. to about 130° C. at 0.7 mm. Hg distills off as colorless product which contains no saponifiable chlorine.

$C_9H_4Cl_2N_2O_2$ (243.05). Calculated: C, 44.47; H, 1.66; N, 11.53; Cl, 29.18; saponifiable Cl, 0. Found: C, 44.05, 44.16; H, 1.59, 1.65; N, 11.19, 11.30; Cl, 25.50; saponifiable Cl, 0.

*Example 5*

About 700 grams of chlorine are introduced at about 55° C. into a solution of about 523 grams 2,6-toluylene diisocyanate and about 25 grams iodine in 0.5 liter of chloroform and another about 400 grams of chlorine are introduced at about 70° C. When the chloroform has been distilled off, the residue is degasified for about one hour at about 140° C. and 12 mm. Hg. About 5 grams ferric chloride and about 50 cc. xylene are then added and the mixture stirred for about one hour at about 130° C. and about three hours at about 160° C. while at the same time a powerful stream of nitrogen is passed through. Xylene is distilled off and the residue is degasified at about 150° C. and 12 mm. Hg and fractionated. The 3,4,5-trichloro-2,6-toluyene diisocyanate distills off at about 130° C. to about 135° C. and 0.4 mm. Hg.

$C_9H_3Cl_3N_2O_2$ (277.50). Calculated: C, 38.97; H, 1.09; Cl, 38.34; saponifiable Cl, 0. Found: C, 38.55, 38.82; H, 1.04, 1.02; Cl, 38.0; saponifiable Cl, 0.

*Example 6*

About 1046 grams 2,4-toluylene diisocyanate and about 40 grams iodine are dissolved in about 1.3 liters of chloroform. About 1000 grams bromine are then added dropwise at about 70° C. Chloroform is then distilled off and the residue is degasified for about one hour at about 150° C. and 12 mm. Hg and about 10 grams ferric chloride and about 150 cc. xylene are then added. Nitrogen is then passed through for about one hour at about 130° C. and for about three hours at about 160° C. Xylene is then distilled off and the residue is degasified for about one hour at about 150° C. and 12 mm. Hg and fractionated in vacuo. Bromo-2,4-toluylene diisocyanate in the form of a colorless liquid distills over at about 125° C. to about 130° C. at 0.5 mm. Hg and solidifies in the receiver.

$C_9H_5BrN_2O_2$ (253.1). Calculated: C, 42.71; H, 1.99; Br, 31.57; saponifiable Br, 0. Found: C, 42.38, 42.50; H, 1.71, 1.79; Br, 31.2, 31.3; saponifiable Br, 0.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for preparing nuclearly halogenated aromatic isocyanates which comprises contacting a nuclearly halogenated aromatic isocyanate containing a halogenoalkyl side chain, the halogen being either chlorine or bromine, with a nucleophilic aromatic compound at temperature of from about 60° C. to about 200° C. in the presence of a Friedel-Crafts catalyst, thereby removing the halogen from the side chain.

2. The process of claim 1 wherein the nuclearly halogenated aromatic isocyanate containing a halogenoalkyl side chain is contacted with a nucleophilic aromatic compound in the presence of an inert gas to remove hydrogen halides.

3. The process of claim 1 wherein the halogenated aromatic isocyanates are obtained from the reaction of a halogen selected from the group consisting of chlorine and bromine with an isocyanate having the formula

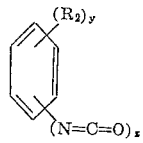

wherein $R_2$ is selected from the group consisting of lower alkyl, lower aralkyl, isocyanato lower alkyl, isocyanato lower aralkyl group and $y$ is an integer of from 1 to 3 and $z$ is an integer of from 0 to 3 with the proviso that $z$ being 0 only when at least one isocyanato group is present in the radical $R_2$.

4. The process of claim 3 wherein the halogenation of said isocyanate is conducted in the presence of a catalyst selected from the group consisting of iodine and ferric chloride, at a temperature of from about 20° C. to about 120° C.

5. The process of claim 4 wherein said halogenation is conducted in the presence of an inert solvent.

References Cited by the Examiner

UNITED STATES PATENTS 2,915,545  12/1959  Tazuma _____ 260—453

FOREIGN PATENTS 835,592  5/1960  Great Britain.

CHARLES B. PARKER, *Primary Examiner.*

D. R. MAHANAND, R. L. RAYMOND,

*Assistant Examiners.*